United States Patent
Bury et al.

(10) Patent No.: US 7,260,661 B2
(45) Date of Patent: Aug. 21, 2007

(54) PROCESSING REPLIES TO REQUEST PACKETS IN AN ADVANCED SWITCHING CONTEXT

(75) Inventors: James Bury, Chandler, AZ (US); Mark Sullivan, Tempe, AZ (US); Joseph A. Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 10/934,640

(22) Filed: Sep. 3, 2004

(65) Prior Publication Data

US 2006/0050694 A1    Mar. 9, 2006

(51) Int. Cl.
*G06F 13/42*    (2006.01)
(52) U.S. Cl. ................. 710/106; 710/308
(58) Field of Classification Search ............... 710/105, 710/106, 110, 112, 305, 306, 308, 310, 311, 710/316; 709/203
See application file for complete search history.

(56) References Cited

U.S. PATENT DOCUMENTS

| | | | | |
|---|---|---|---|---|
| 6,154,839 | A * | 11/2000 | Arrow et al. ............... | 713/154 |
| 6,333,929 | B1 * | 12/2001 | Drottar et al. .............. | 370/362 |
| 6,519,667 | B2 * | 2/2003 | Kondo et al. ............... | 710/306 |
| 6,675,238 | B1 * | 1/2004 | Coffman et al. ............. | 710/46 |
| 7,051,145 | B2 * | 5/2006 | Butler et al. ................ | 710/305 |
| 7,099,318 | B2 * | 8/2006 | Harriman ................... | 370/389 |
| 2003/0131128 | A1 * | 7/2003 | Stanton ..................... | 709/238 |
| 2004/0230709 | A1 * | 11/2004 | Moll ......................... | 710/1 |
| 2005/0041658 | A1 * | 2/2005 | Mayhew et al. ............ | 370/389 |
| 2005/0157725 | A1 * | 7/2005 | Pettey ....................... | 370/392 |
| 2005/0238035 | A1 * | 10/2005 | Riley ......................... | 370/401 |
| 2006/0047771 | A1 * | 3/2006 | Blackmore et al. ......... | 709/209 |
| 2006/0050693 | A1 * | 3/2006 | Bury et al. .................. | 370/389 |
| 2006/0050722 | A1 * | 3/2006 | Bury et al. .................. | 370/403 |

OTHER PUBLICATIONS

Building a Bridge to PCI Express Architecture, COTS Journal, Oct. 2003.*

* cited by examiner

*Primary Examiner*—Khanh Dang
(74) *Attorney, Agent, or Firm*—Fish & Richardson P.C.

(57) ABSTRACT

An apparatus communicates with an advanced switching (AS) fabric. The apparatus includes a transmit engine that generates a request packet for transmission to the AS fabric. The transmit engine associates a first transaction identifier with the request packet. A receive engine receives a reply packet in response to the request packet. The reply packet contains a second transaction identifier. The receive engine compares the first transaction identifier to the second transaction identifier. If the first transaction identifier matches the second transaction identifier, the receive engine decides to store data from the reply packet at an address associated with the first transaction identifier.

15 Claims, 11 Drawing Sheets

PROCESSING REPLIES TO REQUEST PACKETS IN AN ADVANCED SWITCHING CONTEXT

TECHNICAL FIELD

This patent application relates to processing replies to request packets in an advanced switching context.

BACKGROUND

PCI (Peripheral Component Interconnect) Express is a serialized I/O interconnect standard developed to meet the increasing bandwidth needs of the next generation of computer systems. PCI Express was designed to be fully compatible with the widely used PCI local bus standard. PCI is beginning to hit the limits of its capabilities, and while extensions to the PCI standard have been developed to support higher bandwidths and faster clock speeds, these extensions may be insufficient to meet the rapidly increasing bandwidth demands of PCs in the near future. With its high-speed and scalable serial architecture, PCI Express may be an attractive option for use with, or as a possible replacement for, PCI in computer systems. [The PCI Express architecture is described in the PCI Express Base Architecture Specification, Revision 1.0 (Initial release Jul. 22, 2002), which is available through the PCI-SIG (PCI-Special Interest Group) (http://www.pcisig.com)].

AS is an extension to the PCI Express architecture. AS utilizes a packet-based transaction layer protocol that operates over the PCI Express physical and data link layers. The AS architecture provides a number of features common to multi-host, peer-to-peer communication devices such as blade servers, clusters, storage arrays, telecom routers, and switches. These features include support for flexible topologies, packet routing, congestion management (e.g., credit-based flow control), fabric redundancy, and fail-over mechanisms. The AS architecture is described in the Advanced Switching Core Architecture Specification, Revision 1.0 (December 2003), which is available through the ASI-SIG (Advanced Switching Interconnect-SIG) (http//:www.asisig.org).

DESCRIPTION OF THE DRAWINGS

Like reference numerals in different figures indicate like elements.

DESCRIPTION

Generally speaking, a switching fabric is a combination of hardware and software that moves data coming into a network node out the correct port to a next network node. A switching fabric includes switching elements, e.g., individual devices in a network node, integrated circuits contained therein, and software that controls switching paths through the switch fabric.

Figure 1:
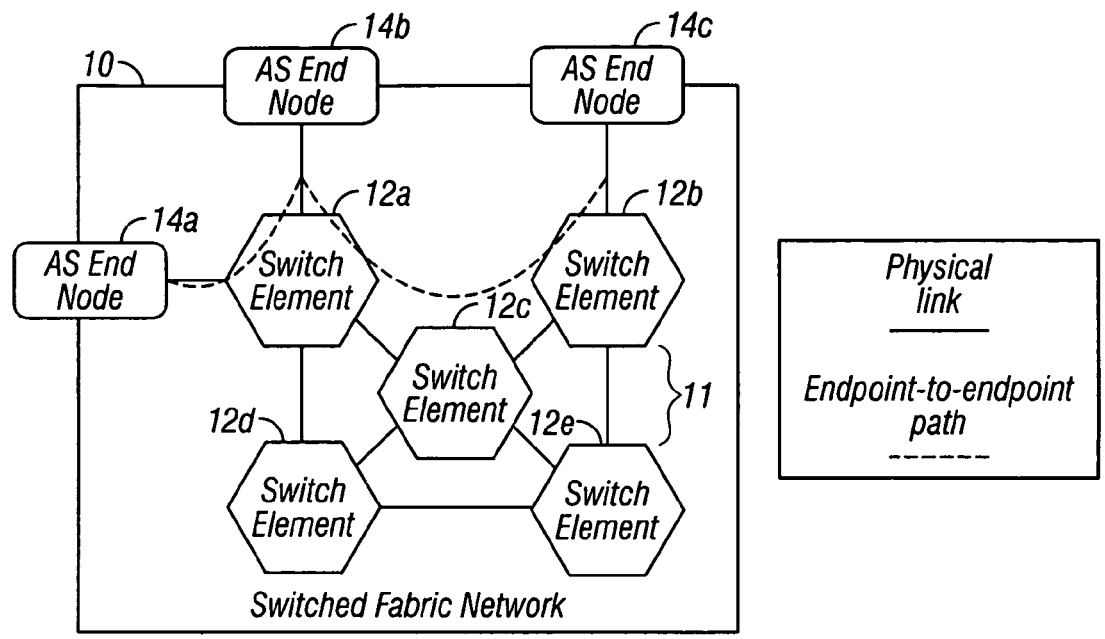
FIG. 1 is a block diagram of a switched fabric network.

FIG. 1 shows a network 10 constructed around an AS fabric 11. AS fabric 11 is a specialized switching fabric that is constructed on the data link and physical layers of PCI express technology. AS fabric 11 uses routing information in packet headers to move data packets through the AS fabric between end nodes of the AS fabric. Any type of data packet may be encapsulated with an AS packet header and transported through the AS fabric. As fabric 11 also supports native protocols, such as simple load store (SLS), described below.

In FIG. 1, switch elements 12a to 12e constitute internal nodes of the network and provide interconnects with other switch elements and end nodes 14a to 14c. End nodes 14a to 14c reside on the "edges" of the AS fabric 11 and handle input and/or output of data to/from AS fabric 11. End nodes 14a to 14c may encapsulate and/or translate packets entering and exiting the AS fabric 11 and may be viewed as "bridges" between AS fabric 11 and interfaces to other networks, devices, etc. (not shown).

Figure 2:
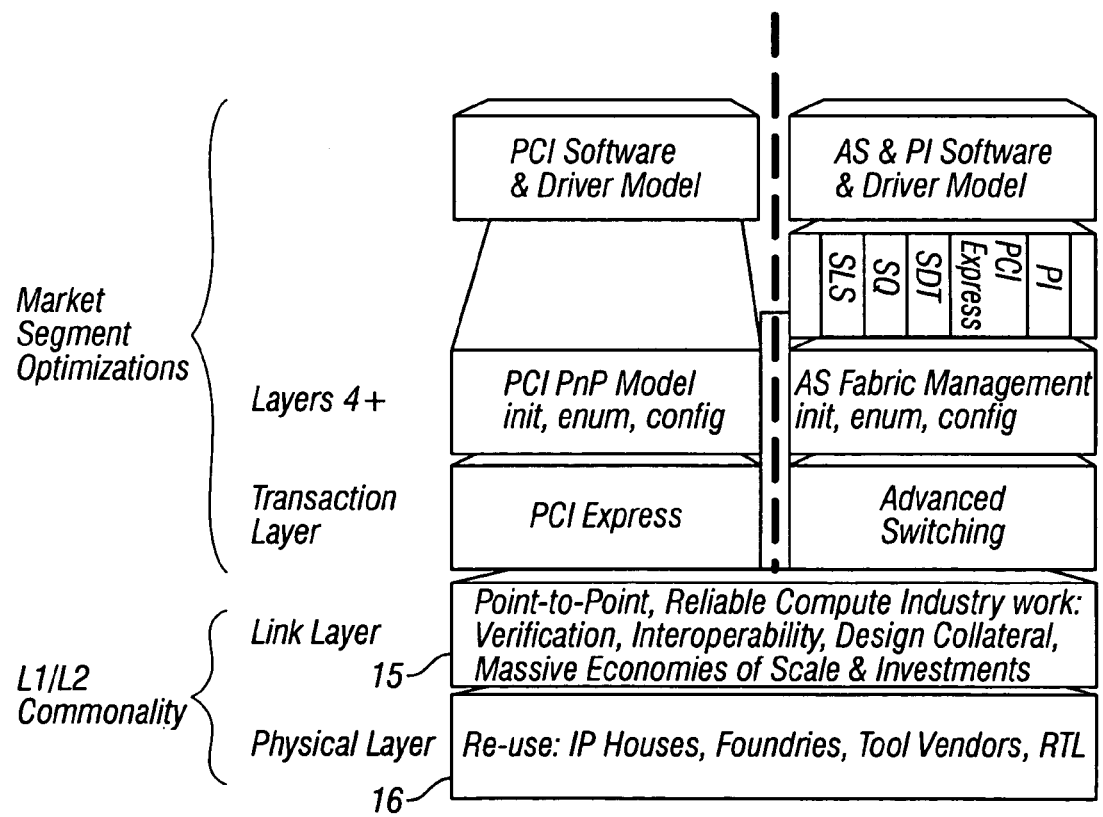
FIG. 2 shows protocol stacks for PCI Express and AS architectures.

As shown in FIG. 2, AS fabric 11 utilizes a packet-based transaction layer protocol that operates over the PCI Express physical and data link layers 15, 16. AS uses a path-defined routing methodology in which the source of a packet provides all information required by a switch (or switches) to route the packet to a desired destination.

Figure 3:
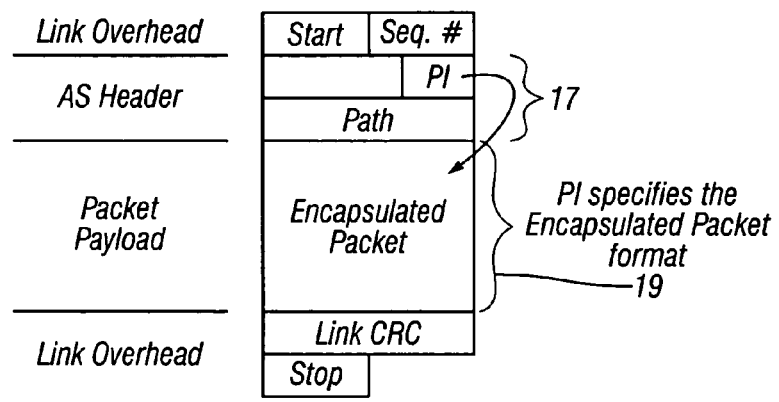
FIG. 3 illustrates an AS transaction layer packet (TLP) format.

FIG. 3 shows an AS transaction layer packet (TLP) format. The packet includes a route header 17 and an encapsulated packet payload 19. The AS route header 17 contains information that is used to route the packet through AS fabric 11 (i.e., "the path"), and a field that specifies the Protocol Interface (PI) of the encapsulated packet. AS switches use the information contained in the route header 11 to route packets and do not care about the contents of the encapsulated packet.

Figure 4:
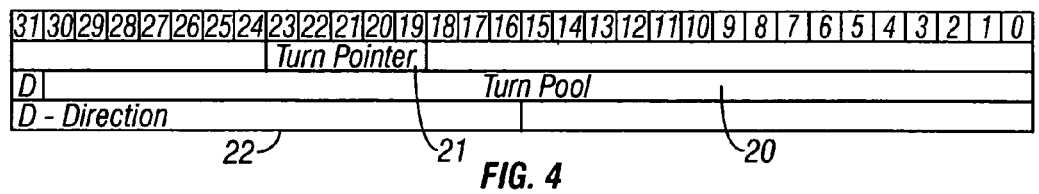
FIG. 4 illustrates an AS route header format.

Referring to FIG. 4, a path may be defined by a turn pool 20, a turn pointer 21, and a direction flag 22 in the route header. A packet's turn pointer indicates the position of a switch's "turn value" within the turn pool. When a packet is received, the switch may extract the packet's turn value using the turn pointer, the direction flag, and the switch's turn value bit width. The extracted turn value for the switch may then used to calculate the egress port.

The PI field in the AS route header specifies the format of the encapsulated packet. The PI field is inserted by the end node that originates the AS packet and is used by the end node that terminates the packet to correctly interpret the packet contents. The separation of routing information from the remainder of the packet enables an AS fabric to tunnel packets of any protocol.

PIs represent fabric management and application-level interfaces to AS fabric 11. Table 1 provides a list of PIs currently supported by the AS Specification.

TABLE 1

AS protocol encapsulation interfaces

| PI number | Protocol Encapsulation Identity (PEI) |
|---|---|
| 0 | Fabric Discovery |
| 1 | Multicasting |
| 2 | Congestion Management |
| 3 | Segmentation and Reassembly |
| 4 | Node Configuration Management |
| 5 | Fabric Event Notification |
| 6 | Reserved |
| 7 | Reserved |
| 8 | PCI-Express |
| 9-223 | ASI-SIG defined PEIs |
| 224-254 | Vendor-defined PEIs |
| 255 | Invalid |

PIs 0-7 are reserved for various fabric management tasks, and PIs 8-254 are application-level interfaces. As shown in Table 1, PI8 is used to tunnel or encapsulate native PCI Express. Other PIs may be used to tunnel various other protocols, e.g., Ethernet, Fibre Channel, ATM (Asynchronous Transfer Mode), InfiniBand®, and SLS (Simple Load Store). An advantage of an AS switch fabric is that a mixture of protocols may be simultaneously tunneled through a single, universal switch fabric making it a powerful and desirable feature for next generation modular applications such as media gateways, broadband access routers, and blade servers.

The AS architecture supports the establishment of direct end node-to-end node logical paths known as Virtual Channels (VCs). This enables a single AS fabric network to service multiple, independent logical interconnects simultaneously. Each VC interconnecting AS end nodes for control, management and data. Each VC provides its own queue so that blocking in one VC does not cause blocking in another. Since each VC has independent packet ordering requirements, each VC can be scheduled without dependencies on the other VCs.

The AS architecture defines three VC types: Bypass Capable Unicast (BVC); Ordered-Only Unicast (OVC); and Multicast (MVC). BVCs have bypass capability, which may be necessary for deadlock free tunneling of some, typically load/store, protocols. OVCs are single queue unicast VCs, which are suitable for message oriented "push" traffic. MVCs are single queue VCs for multicast "push" traffic.

The AS architecture provides a number of congestion management techniques, one of which is a credit-based flow control technique that ensures that packets are not lost due to congestion. Link partners in the network (e.g., an end node 14a and a switch element 12a) exchange flow control credit information to guarantee that the receiving end of a link has the capacity to accept packets. Flow control credits are computed on a VC-basis by the receiving end of the link and communicated to the transmitting end of the link. Typically, packets are transmitted only when there are enough credits available for a particular VC to carry the packet. Upon sending a packet, the transmitting end of the link debits its available credit account by an amount of flow control credits that reflects the packet size. As the receiving end of the link processes (e.g., forwards to an end node 14a) the received packet, space is made available on the corresponding VC and flow control credits are returned to the transmission end of the link. The transmission end of the link then adds the flow control credits to its credit account.

The AS architecture supports an AS Configuration Space in each AS device in the network. The AS Configuration Space is a storage area that includes fields that specify device characteristics, as well as fields used to control the AS device. The information is presented in the form of capability structures and other storage structures, such as tables and a set of registers. The information stored in the AS-native capability structures can be accessed through PI-4 packets, which are used for device management. In one embodiment of an AS fabric network, AS end node devices are restricted to read-only access of another AS device's AS native capability structures, with the exception of one or more AS end nodes that have been elected as fabric managers.

A fabric manager election process may be initiated by a variety of hardware or software mechanisms. A fabric manager is an AS end node that "owns" all of the AS devices, including itself, in the network. If multiple fabric managers, e.g., a primary fabric manager and a secondary fabric manager, are elected, then each fabric manager may own a subset of the AS devices in the network. Alternatively, the secondary fabric manager may declare ownership of the AS devices in the network upon a failure of the primary fabric manager, e.g., resulting from a fabric redundancy and fail-over mechanism.

Once a fabric manager declares ownership, it has privileged access to its AS devices' AS native capability structures. In other words, the fabric manager has read and write access to the AS native capability structures of all of the AS devices in the network, while the other AS devices are restricted to read-only access, unless granted write permission by the fabric manager.

AS fabric 11 supports the simple load store (SLS) protocol. SLS is a protocol that allows one end node device, such as the fabric manager, to store, and access, data in another end node device's memory, including, but not limited to, the device's configuration space. Memory accesses that are executed via SLS may be direct, meaning that an accessing device need not go through a local controller or processor on an accessed device in order to get to the memory of the accessed device. SLS data packets are recognized by specific packet headers that are familiar to AS end node devices, and are passed directly to hardware on the end node devices, which performs the requested memory access(es).

Figure 5:
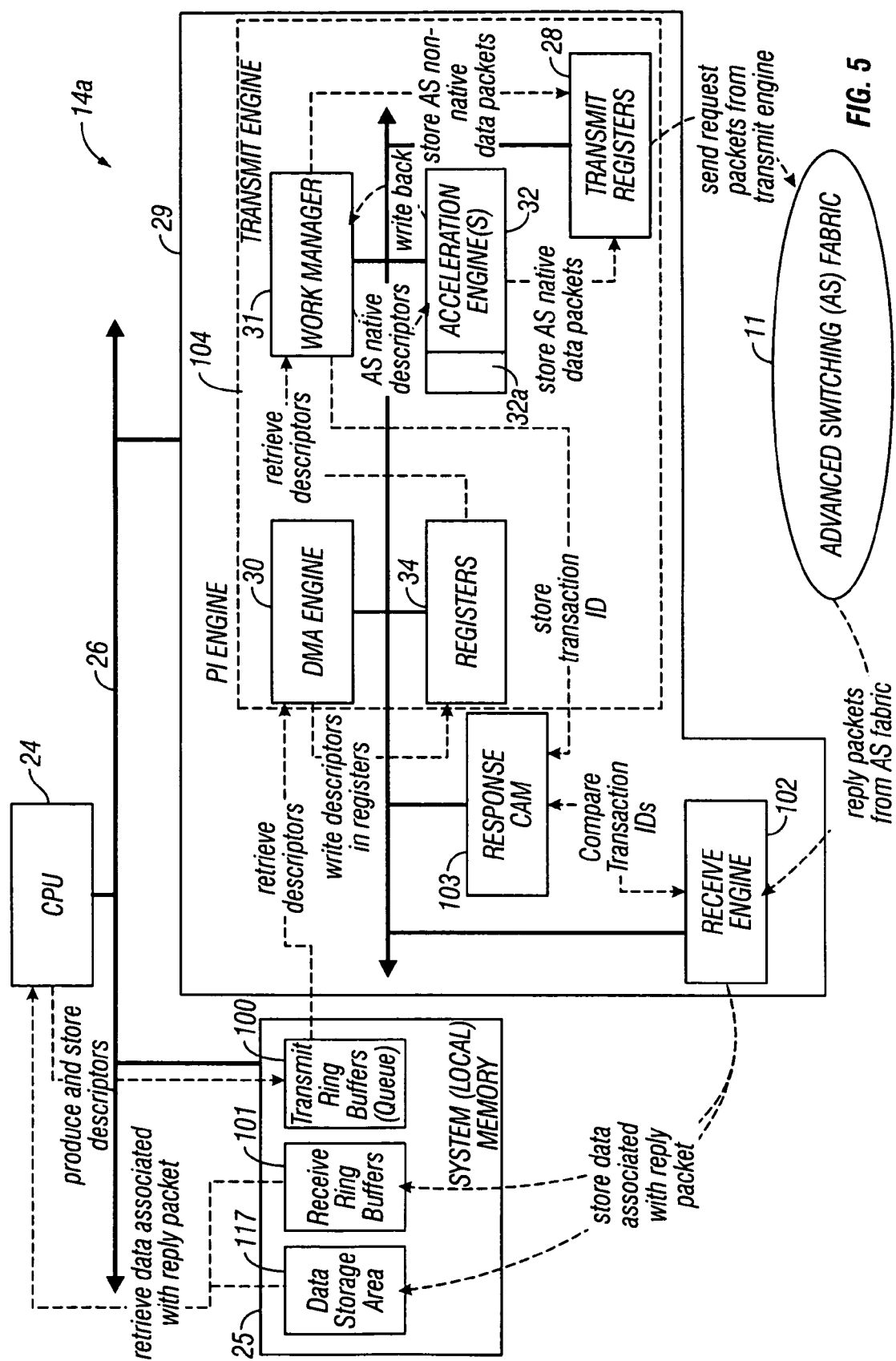
FIG. 5 is a block diagram of an architecture of an AS fabric end node device.

FIG. 5 shows an architecture of an AS fabric end node device 14a. The arrows in FIG. 5 represent possible data flows between the various elements shown. It is noted that FIG. 5 only shows components of the AS fabric end node device that are relevant to the current description. Other components may be present and, in fact, such components are described below with respect to FIG. 13.

End node device 14a uses direct memory access (DMA) technology to build data packets for transmission to AS fabric 11. DMA is a technique for transferring data from memory without passing the data through a central controller (e.g., a processor) on the device. Device 14a may be a work station, a personal computer, a server, a portable computing device, or any other type of intelligent device capable of executing instructions and connecting to AS fabric 11.

Device 14a includes a central processing unit (CPU) 24. CPU 24 may be a microprocessor, microcontroller, programmable logic, or the like, which is capable of executing instructions (e.g., a computer program) to perform one or more operations. Such instructions may be stored in system memory 25 (i.e., local memory), which may be one or more hard drives or other internal or external memory devices connected to CPU 24 via one or more communications media, such as a bus 26. System memory 25 may include transmit ring buffers 100 and receive ring buffers 101, which make up a queue, for use in transmitting data packets to, and receiving data packets from, AS fabric 11.

Device 14a also includes protocol interface (PI) engine 29. PI engine 29 may include one or more separate hardware devices, or may be implemented in software running on CPU 24. In this embodiment, PI engine 29 is implemented on a separate chip, which communicates with CPU 24 via bus 26, and which may communicate with one or more PCI express devices (not shown) via PCI express bus(es) (also not shown). A chipset (not shown) may also be included to enable communication.

PI engine 29 functions as CPU 24's interface to AS fabric 11. In this embodiment, PI engine 29 contains a DMA engine 30, a work manager engine 31, and one or more acceleration engines 32. Registers 34 are included in PI engine 29 for use by its various components, and may include one or more first-in first-out (FIFO) registers. Transmit registers 28 provide a "transmit" interface to advanced switching (AS) fabric 11. PI engine 29 also contains a receive engine 102 that receives data packets from AS fabric 11, and a response content-addressable memory (CAM) 103 that is used in receiving packets, in particular reply packets.

DMA engine 30, registers 34, work manager 31, acceleration engines 32 and transmit registers 28 comprise a transmit engine 104 for transmitting data packets to AS fabric 11. In other embodiments, transmit engine 104 may include different components than those of FIG. 5.

DMA engine 30 is a direct memory access engine, which retrieves descriptors from transmit ring buffers 100, and which stores the descriptors in registers 34. As described below, descriptors are data structures that contain information used to build data packets. Work manager 31 is an engine that controls work flow among entities used to build data packets, including DMA engine 30 and acceleration engines 32. Work manager 31 also builds data packets for non-native AS protocols. Acceleration engines 32 are protocol-specific engines, which build data packets for pre-defined native AS protocols. The operation of these components of PI engine 29 is described below with respect to FIG. 6.

Different descriptor formats are supported by device 14a. Examples of such descriptor formats include the "immediate" descriptor format, the "indirect" descriptor format, and the "packet-type" descriptor format. An immediate descriptor contains all data needed to build a data packet for transmission over the AS fabric, including the payload of the packet. An indirect descriptor contains all data needed to build a data packet, except for the packet's payload. The indirect descriptor format instead contains one or more addresses identifying the location, in system memory 25, of data for the payload. A packet-type descriptor identifies a section of memory that is to be extracted and transmitted as a data packet. The packet-type descriptor is not used to format a packet, but instead is simply used to extract data specified at defined memory addresses, and to transmit that data as a packet. In this embodiment, each descriptor is 32 bits (one "D-word") wide and sixteen D-words long.

Figure 7:
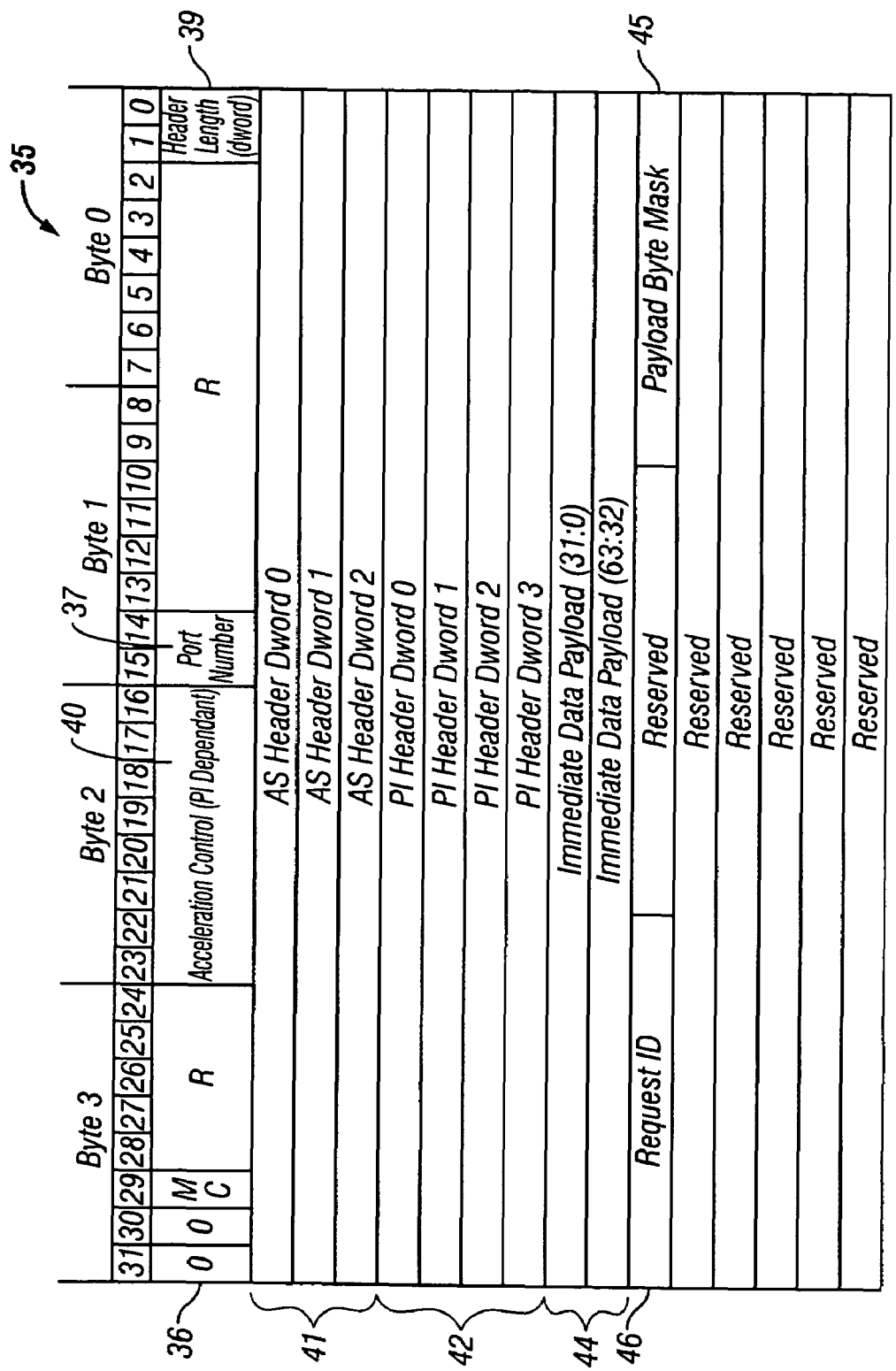
FIGS. 7, 8 and 9 are diagrams showing data structures of descriptors used with the AS fabric end node device.

An example of an immediate descriptor 35 is shown in FIG. 7. In FIG. 7, bits 36 contain control information that identifies the "type" of the descriptor, e.g., immediate, indirect, or packet. Bits 37 contain a port number of device 14a for transmission of a resulting data packet. Bits 39 identify the length of the packet header. Byte 40 contains acceleration control information. As described in more detail below, the acceleration control information is used to determine how a data packet is built from the descriptor, i.e., which engines are used to build the data packet. D-words 41 contain information used to build a unicast or multicast route header, including a unicast address and/or multicast group address. D-words 42 contain non-routing packet header information, e.g., information to distinguish and combine data packets. D-words 44 contain data that makes up the payload of the data packet. Bits 45 identify bytes to be ignored in a payload. Bits 46 contains a transaction identifier (ID) that identifies the data packet as a request packet, and that is used as described below. The portions labeled "R" or "Reserved" are reserved for future use.

Figure 8:
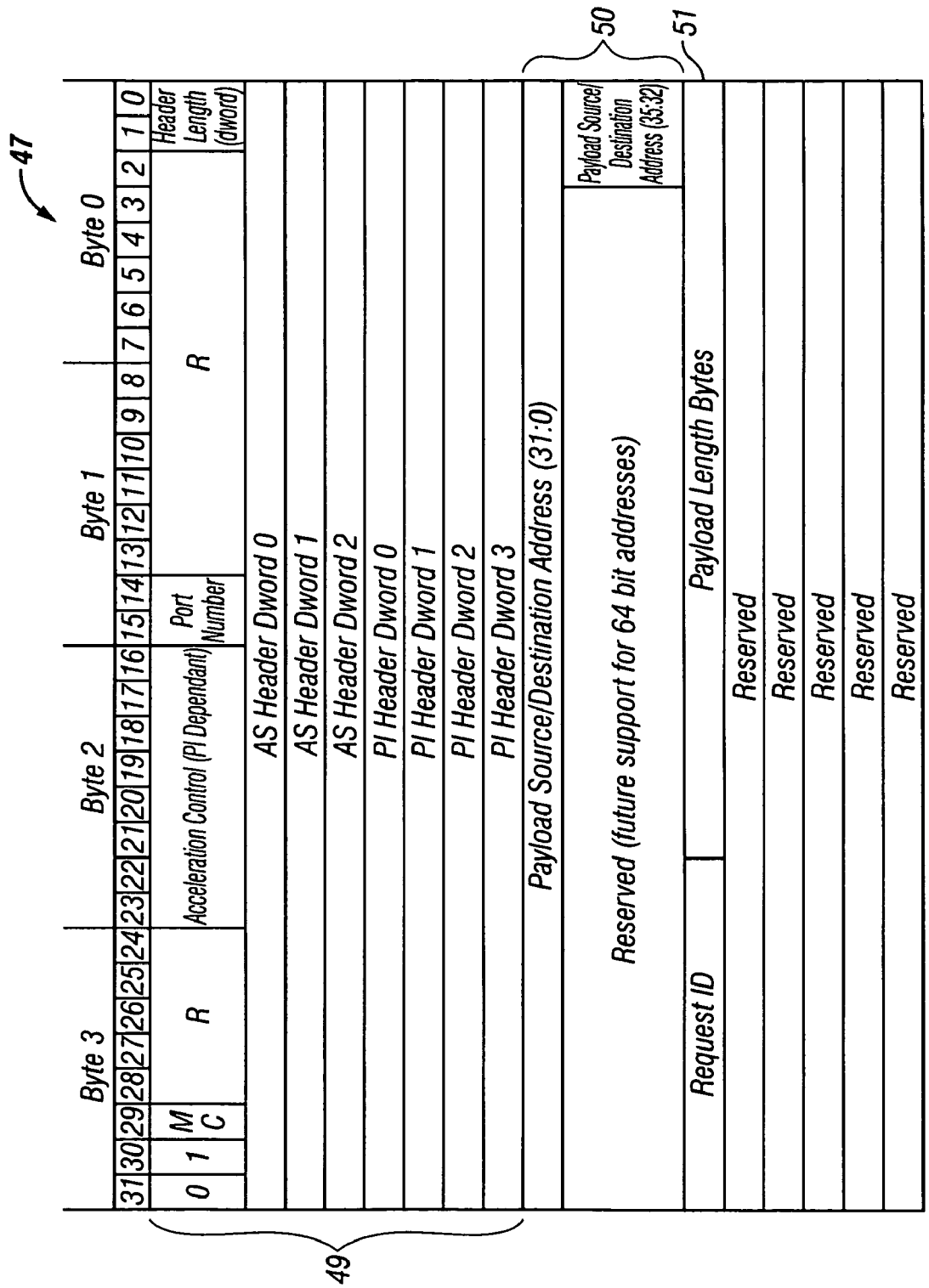

An example of an indirect descriptor 47 is shown in FIG. 8. Section 49 of the indirect descriptor is identical to that of immediate descriptor 35 (FIG. 7). In place of data for the payload, indirect descriptor 47 contains data 50 identifying starting address(es) for the payload. Indirect descriptor also contains data 51 identifying the length of the payload.

Figure 9:
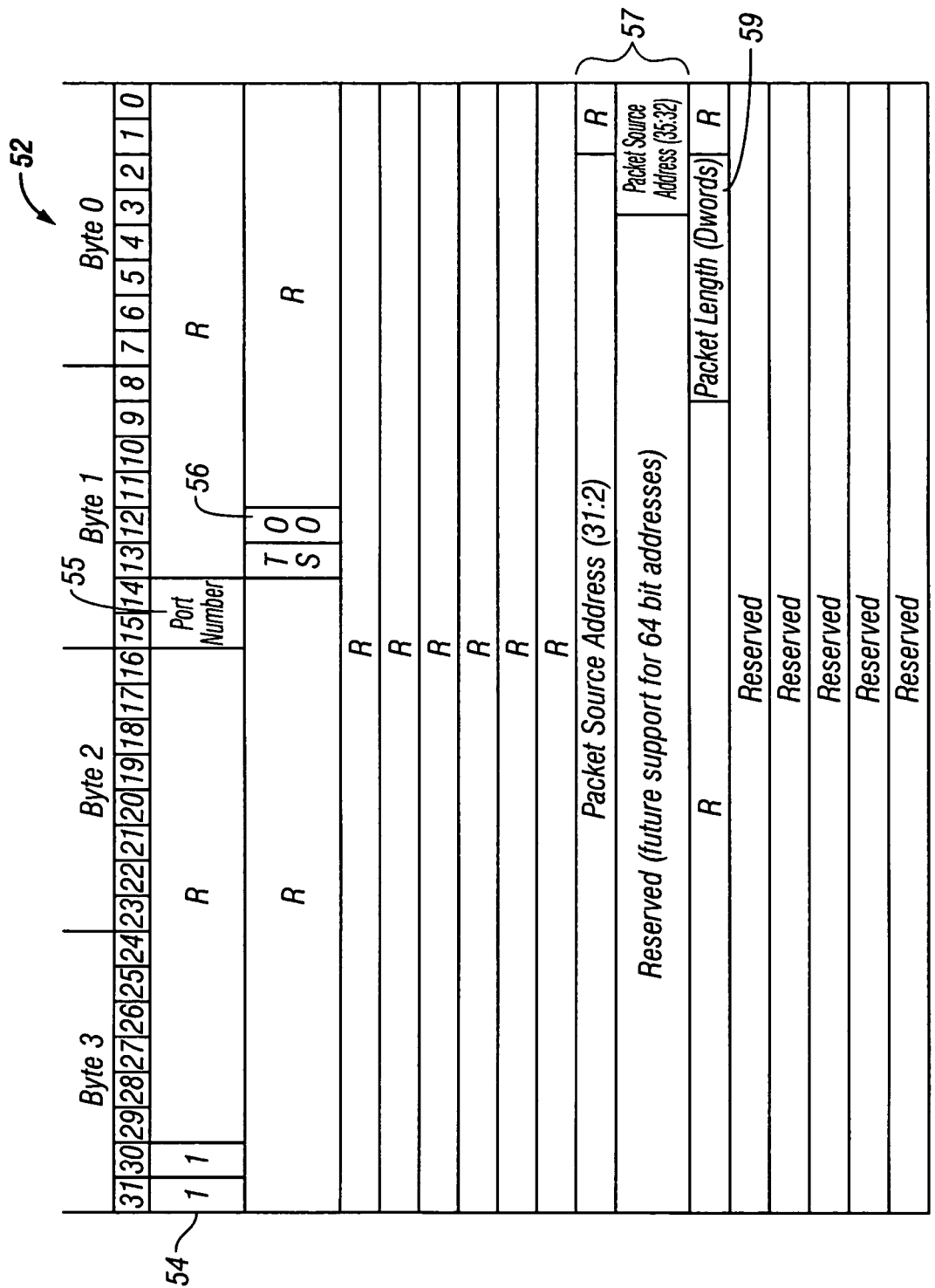

An example of a packet-type descriptor 52 is shown in FIG. 9. Packet-type descriptor 52 contains bits 54 identifying the data packet as a packet-type descriptor; bits 55 identifying a port number associated with the data packet; and bits 56 used in the AS route header. Packet-type descriptor 52 also contains data 57 identifying the starting address (es), in system memory, of data that makes up the packet. The length 59 of the data, in D-words, is also provided in packet-type descriptor 52.

Figure 6:
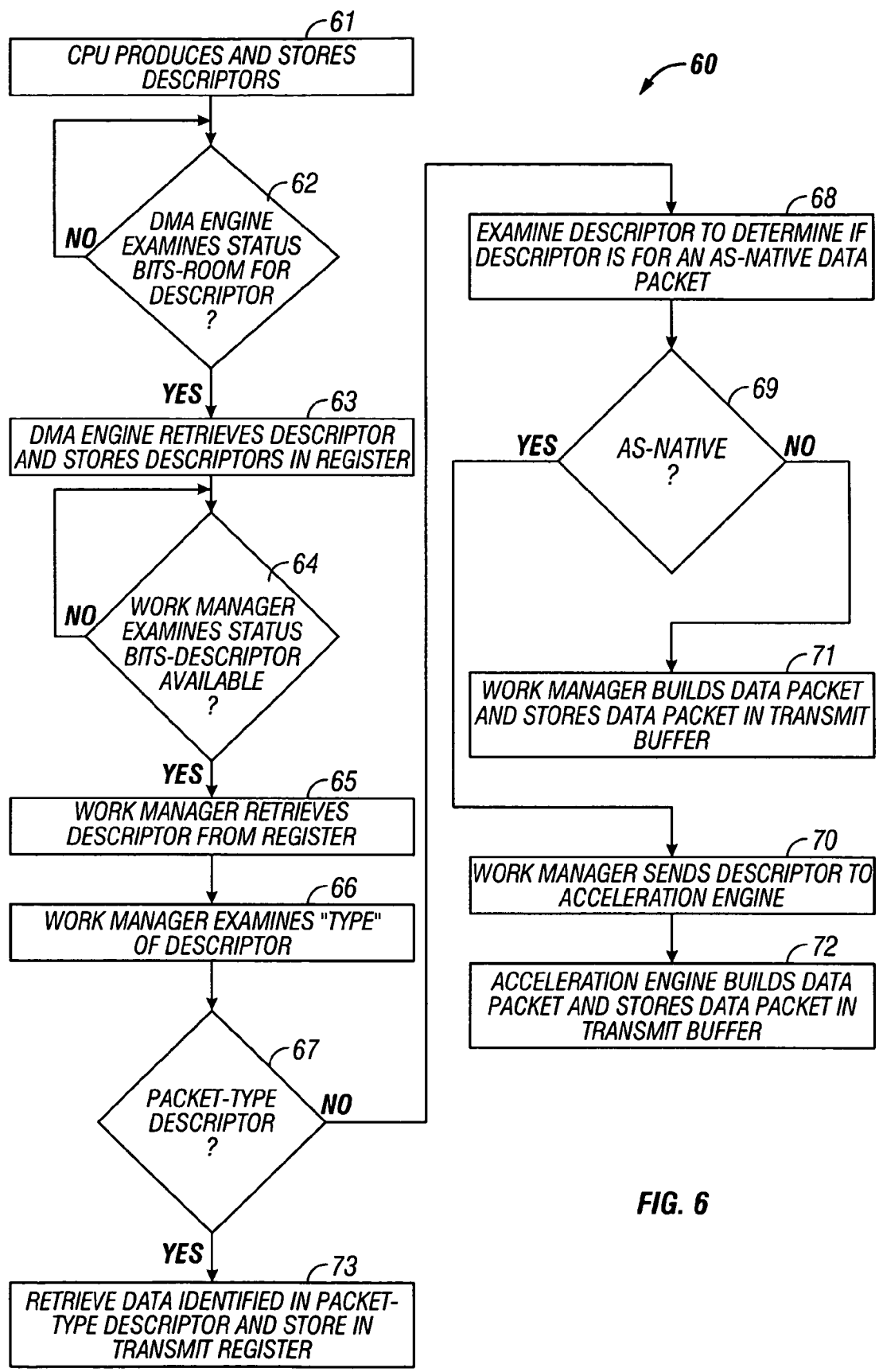
FIG. 6 is a flowchart of a process that may be executed on the AS fabric end node device.

FIG. 6 shows a process 60 by which end node device 14a generates data packets for transmission to AS fabric 11. In process 60, CPU 24 produces (61) descriptors and stores them in a queue in system memory 25. In this embodiment, the queue is comprised of eight transmit ring buffers 100—one ring buffer per virtual channel supported by end node device 14a.

DMA engine 30 retrieves descriptors from transmit ring buffers 100 for storage in registers 34. In this embodiment, there are eight registers capable of holding two descriptors each, and DMA engine 30 retrieves the descriptors in the order in which they were stored in the transmit ring buffers, i.e., first-in, first-out.

Each of registers 34 includes one or more associated status bits. These status bits indicate whether a register contains zero, one or two descriptors. The status bits are set, either by DMA engine 30 or work manager 31 (described below). DMA engine 30 determines whether to store the descriptors based on the status bits of registers 34. More specifically, as described below, work manager 31 processes (i.e., "consumes") descriptors from registers 34. Once a descriptor has been consumed from a register, work manager 31 resets the status bits associated with that register to indicate that the register is no longer full. DMA engine 30 examines (62) the status bits periodically to determine whether a register has room for a descriptor. If so, DMA engine 30 retrieves (63) a descriptor (or two) from the ring buffers. DMA engine 30 stores that descriptor in an appropriate register. DMA engine 30 stores the descriptor in a register that is dedicated to the same virtual channel as the ring buffer from which the descriptor was retrieved. DMA engine 30 may also store a tag associated with each descriptor in registers 34. Use of this tag is described below.

Work manager 31 examines (64) the status bits of each register to determine whether a descriptor is available for processing. If a descriptor is available, work manager 31 retrieves (65) that descriptor and processes the descriptor in the manner described below.

A priority level associated with each register may affect how the work manager retrieves descriptors from the registers. More specifically, each register may be assigned a priority level. The priority level indicates, to work manager 31, a number of descriptors to retrieve from a target register before retrieving descriptors from other registers. Circuitry (not shown), such as a counter, associated with each register maintains the priority level of each register. The circuitry stores a value that corresponds to the priority level of an associated register, e.g., a higher value indicates a higher priority level. Each time work manager 31 retrieves a descriptor from the target register, the circuitry increments a count, and the current value of the count is compared to the priority level value. So long as the count is less than or equal to the priority level value of a target register, work manager 31 continues to retrieve descriptors only from the target register. If no descriptors are available from the target register, work manager 31 may move on to another register, and retrieve descriptors from that other register until descriptors from the target register become available.

Work manager 31 examines (66) retrieved descriptors in order to determine a type of the descriptor. In particular, work manager 31 examines the ID bytes of each descriptor to determine the type of the descriptor. Since packet-type descriptors simply define "chunks" of data as a packet, packet-type descriptors do not contain acceleration control information (see FIG. 9). Hence, when a packet-type descriptor is identified (67), work manager 31 simply retrieves (73) data specified in the descriptor by address and packet length, and uses that data as the packet. No formatting or other processing is performed on the data. The resulting "packet" is stored in transmit registers 28 for transmission onto AS fabric 11.

For immediate descriptors and indirect descriptors, work manager 31 also examines the descriptor to determine whether the descriptor is for a data packet having a protocol that is native to AS, such as SLS, or for packets that have a protocol that is non-native to AS, such as ATM. In particular, work manager 31 examines the acceleration control information of immediate descriptors and indirect descriptors.

If the acceleration control information indicates (69) that the descriptor is for a data packet having a protocol that is non-native to AS fabric 11, work manager 31 builds (71) one or more data packets from the descriptor.

If the descriptor is an immediate descriptor, work manager 31 builds a data packet using the descriptor. In particular, work manager 31 builds a packet header from D-words 41 and 42 (FIG. 7) which, as noted above, contain route information and non-route information, respectively. Work manager 31 builds the payload using D-words 44 which, as noted above, contain the payload for the data packet.

If the descriptor is an indirect descriptor, work manager 31 builds a header for the data packet in the same manner as for an immediate descriptor. Work manager 31 builds a packet payload by retrieving a payload for the packet from address(es) 50 (FIG. 8) specified in the descriptor. Work manager 31 retrieves data from the first address specified. In this embodiment, AS packets are limited to 320 bytes. If the amount of the payload specified in the descriptor causes the packet length to exceed 320 bytes, work manager 31 builds a packet that is 320 bytes. Work manager then builds another packet, using substantially the same header information as the first data packet, and a different payload. The payload, in this case, includes data from the address(es) specified in the descriptor, starting at the address where the first data packet ended. The header information in this next data packet includes the same routing information as the first data packet, but a different packet identifier (ID) to differentiate it from the first data packet. Work manager 31 continues to build data packets in this manner until all of the data specified in the indirect descriptor has been packetized (i.e., "consumed").

Work manager 31 stores data packets in transmit registers 28, from which the data packets are output to AS fabric 11.

Work manager 31 may build request packets, which are used to request information from other end node devices on AS fabric 11. SLS packets may be used as request packets. Work manager 31 builds into each request packet a unique transaction identifier (ID), which should be returned in a reply to the request packet in order to recognize the reply as such. The transaction ID is set by CPU 24 in a descriptor. For example, bits 46 of descriptor 35 constitute its transaction ID. Upon completion of a request packet, work manager 31 stores, in response CAM 103, the transaction ID of the request packet. A descriptor of each request packet includes a local address to which reply data is to be written. This local address is also included in response CAM 103 in association with the transaction ID of a corresponding request packet.

Referring back to FIG. 6, work manager 31 may determine (69) that the acceleration control information in a data packet indicates that the packet-type descriptor is for a data packet that has a protocol that is native to AS fabric 11, e.g., SLS. In this case, work manager 31 parses the descriptor and sends (70) the resulting parsed information to the appropriate acceleration engine, e.g., acceleration engine 32*a* for SLS packets. Work manager 31 instructs acceleration engine 32*a* to build data packet(s) from the descriptor information, thereby freeing work manager 31 for other tasks, such as building packets for "non-native" descriptors. In response to the instruction from work manager 31, acceleration engine 32*a* builds a data packet.

Work manager 31 uses a tag system to keep track of packet processing with acceleration engines 32. As noted above, work manager 31 retrieves all necessary information/data it needs from registers 34, along with an associated tag. For native AS packets, work manager 31 instructs an acceleration engine 32 to build the packet (e.g., if the packet is SLS).

When building the packet header, acceleration engine 32*a* sends a payload fetch request to work manager 31 to request payload for the packet. Along with the request, the acceleration engine sends a copy of the tag that work manager 31 forwarded to acceleration engine 32*a*. The returned tag, however, has been altered to instruct work manager 31 to retrieve payload for the packet, and to provide the payload to the acceleration engine for packet building.

When building the data packet, acceleration engine 32*a* issues a write back command to work manager 31. The write back command may notify work manager 31 that a packet has been built. If the payload of the data packet is too big to be accommodated in a single packet, the write back command identifies the data that has been packetized by acceleration engine 32*a*. Specifically, the write back command specifies the ending address of the packetized data. Work manager 31 receives the write back command and determines whether all of the data in the original descriptor has been packetized (e.g., work manager 31 determines if the ending address in the write back command corresponds to the ending address of the total amount of data to be packetized). If all of the data has been packetized, work manager 31 sets the status bits of a corresponding register 34 to indicate that there is room for another descriptor. If all of the data in the original descriptor has not been packetized, work manager 31 instructs acceleration engine 32*a* to build another data packet using substantially the same packet header information as the previous data packet. Work manager 31 instructs acceleration engine 32*a* that the payload for this next packet is to start at the address at which the previous packet ended.

The back-and-forth process between the acceleration engine and the work manager continues until the entire descriptor has been consumed. Acceleration engine 32*a* stores completed data packets in transmit registers 28 for transmission onto AS fabric 11.

As was the case above, acceleration 32*a* engine writes, into response CAM 103, the transaction ID and corresponding local address of each request packet generated by acceleration engine 32*a*. In alternative embodiments, work manager 31 may be configured to write this information to response CAM 103.

Figure 12:
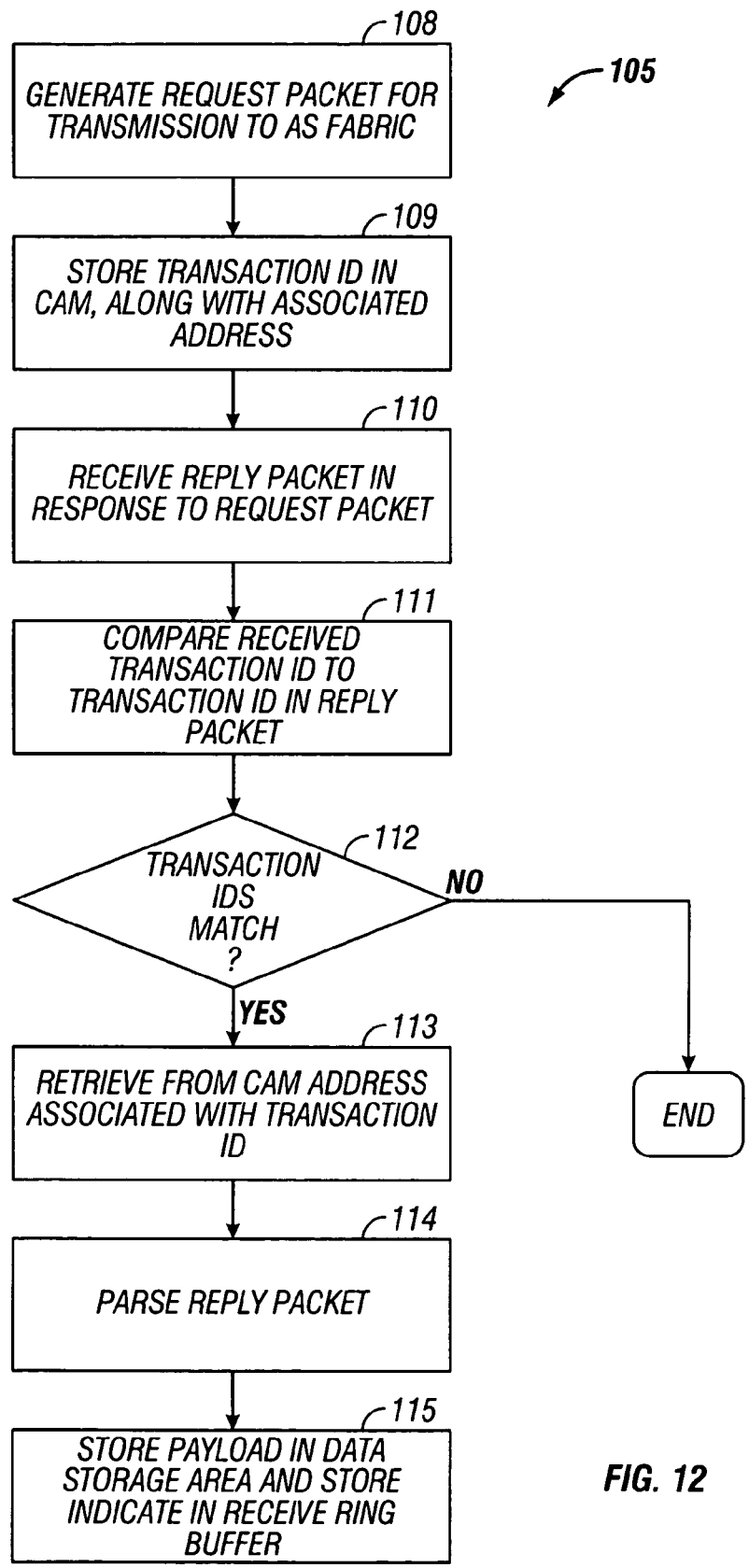
FIG. 12 is a flowchart of a process that may be executed on the AS fabric end node device.

FIG. 12 shows a process 105 for handling request packets. Process 105 may be implemented via PI engine 29, in conjunction with system memory 25 and CPU 24. In process 105, transmit engine 104 generates (108) a request packet for transmission to AS fabric 11. Transmit engine 104 generates the request packet in accordance with process 60 of FIG. 6. When generating the request packet, work manager 31 stores (109) a transaction ID for the request packet in response CAM 103, along with a local address to which a reply to the request packet should be written. This local address is obtained from a descriptor used to build the request packet.

The request packet is transmitted to another device (not shown) in communication with the AS fabric, such as end node device 14*c* (FIG. 1). The request packet may be an SLS packet or other type of packet that requests information from device 14*c*. In response to the request packet, device 14*c* generates, and sends out over AS fabric 11, a reply packet. The reply packet typically contains the information requested in the request packet, along with the transaction ID specified in the request packet. Occasionally, more than one reply packet may be generated in response to a request packet. In this case, each reply packet will contain the same transaction ID, i.e., that of the request packet.

PI engine 29, in particular receive engine 102, receives (110) the reply packet in response to the request packet. Receive engine 102 extracts the transaction ID from the reply packet and compares (111) the transaction ID to the transaction IDs stored in response CAM 103. If a match is found (112), receive engine 102 retrieves (113), from response CAM 103, the local address that corresponds to the "matched" transaction ID. Receive engine 102 uses this local address to store information from the reply packet for use by CPU 24.

More specifically, receive engine 102 parses (114) the reply packet to obtain its payload. Receive engine 102 decides to store (115) the payload in the local address associated with the reply packet's transaction ID, e.g., in data storage area 117. Receive engine 102 also decides to store (115), in a receive ring buffer 101, an indication that the reply packet has been received. The indication may include the transaction ID of the request and reply packets. The transaction ID may also include information identifying a sender of the reply packet. This information may be culled from the reply packet header. Actual storage in the receive ring buffers may be performed via memory interfacing logic (not shown) in response to commands from the receive engine.

In cases where plural reply packets are issued in response to a single request packet, receive engine 102 assigns, and keeps track of, a sequence identifier (ID) for each reply packet. That is, if receive engine 102 detects more than one reply packet with the same transaction ID, receive engine 102 knows that there is more than one reply packet in response to the request packet having that transaction ID. Receive engine 102, therefore, associates a sequence ID with each received reply packet. Each time a reply packet with the same transaction number is received, receive engine 102 increments the sequence ID. When receive engine 102 determines that there are no additional reply packets to receive, i.e., that a last reply packet in a series has been received, receive engine 102 decides to store an appropriate indication in receive ring buffers 101 along with the sequence number of the last reply packet. CPU 24 uses this information when retrieving payload data for the reply packets from data storage area 117. Receive engine 102 may identify a last reply packet in a series using information in the packet itself or based on an elapsed time following receipt of the first packet in the series.

CPU 24 checks receive ring buffer 101 periodically for indications of replies to issued request packets. CPU 24 does this by checking receive ring buffers 101 for a transaction ID (and sequence ID). CPU 24 then retrieves data from address(es) in data storage area 117 that correspond to the transaction ID (and sequence ID).

Process 105 may be implemented outside of a request packet/reply packet context. More specifically, a variant of process 105 may be used to identify devices attempting to read to, or write to, system memory 25. In this regard, as noted above, a first AS end node device has the capability, through the SLS protocol, to read from, or write to, local memory of a second AS end node device without going through the local CPU of the second AS end node device. This local CPU does not know the identity of a device attempting an access. Process 105 may be used to provide the local CPU with this identity.

More specifically, upon receiving a read request or write request packet for access to system memory 25, receive engine 102 may parse the packet's header from its payload. Receive engine 102 decides to store the packet header in receive ring buffer 101 and may issue an interrupt to CPU 24 indicating an attempted memory access. The interrupt may be issued when the access is first attempted, when the access has been completed, or somewhere in between. In response, CPU 24 may retrieve the header information from receive ring buffer 101 and determine the identity of the device making access.

In this embodiment, there are four receive ring buffers. Other embodiments may contain different numbers of receive ring buffers that are configured differently from those described herein. Here, the receive ring buffers are organized by PI number. For example, each receive ring buffer may be dedicated to receiving data packets for one or more PI numbers. As a result of this arrangement, the receive ring buffers may fill at different rates. Circuitry is therefore provided on PI engine 29 to assist CPU 24 in determining when to retrieve data from the receive ring buffers.

Figure 13:
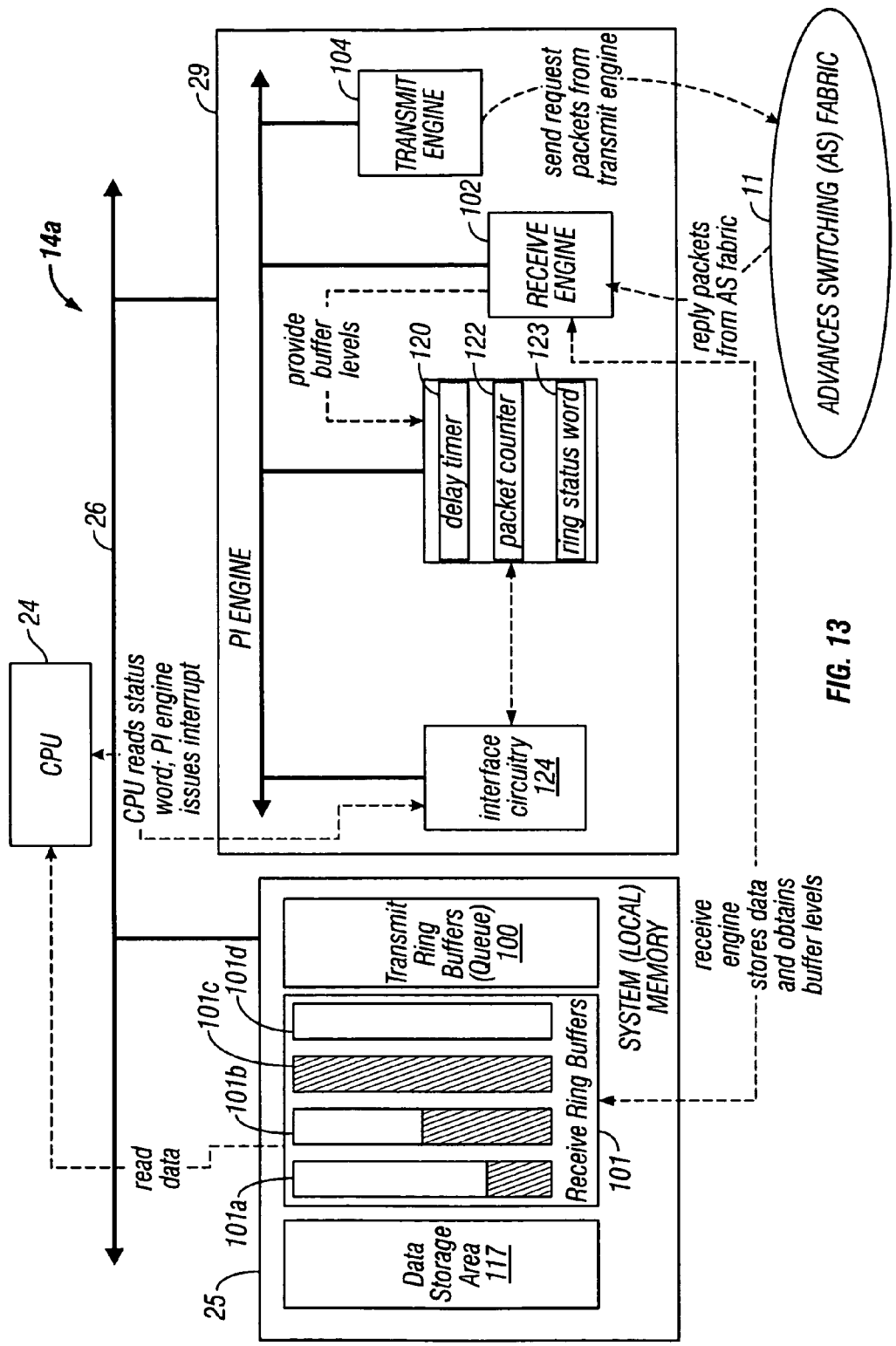
FIG. 13 is a block diagram of the same hardware shown in FIG. 5, but with different elements depicted.

FIG. 13 shows the architecture of AS fabric end node device 14*a*, emphasizing different components from those shown in FIG. 5. As shown in FIG. 13, these components include a delay timer 120, a packet counter 122, and a ring status word register 123. Interface circuitry 124 acts as a mediator for signals traveling between CPU 24 and delay timer 120, packet counter 122, and ring status word register 123.

Delay timer 120 issues a processor interrupt at predetermined periods so long as at least one item has been added to a receive ring buffer since the occurrence of a previous processor interrupt. Packet counter 122 issues a processor interrupt after a predetermined number of packets have been processed by receive engine 102. Ring status word register 123 contains data indicating a level of fullness of receive ring buffers 101. Receive engine 102 measures the fullness of each receive ring buffer (e.g., based on its head and tail pointers), and sets appropriate status words in ring status word register 123. For example, in FIG. 13, receive ring buffer 101a may be ¼ full or within a range of ¼ full, receive ring buffer 101b may be ½ full or within a range of ¼ full, receive ring buffer 101c may be full, and receive ring buffer 101d may be empty. Four status bits may be available for each ring buffer; however, all status bits need not be used. By placing all status bits into a single register, the state of all rings can be determined by making a single read access. For example, 00 may indicate that ring buffer 101d is less than ¼ full; 01 may indicate that ring buffer 101a is greater than or equal to ¼ full; 10 may indicate that ring buffer 101b is greater than or equal to ½ full; and 11 may indicate that ring buffer 101c is greater than or equal to ¾ full. In other embodiments, more or less than four levels may be detected, and the levels detected may be other than the four listed, namely empty, full, ½ and ¼.

When either the delay timer or the counter issues an interrupt, both are initialized (i.e., returned to their starting values).

As noted, receive engine 102 detects the buffer levels and sets the status bits in ring status word register 123. Each time CPU 24 receives an interrupt from either delay timer 120 or packet counter 122, CPU 24 checks ring status word register 123. The information in ring status word register determines the ring buffer from which CPU 24 first retrieves data. For example, in one embodiment, CPU 24 retrieves data from the ring buffer that is most full, and then retrieves data from the ring buffer that is next most full, and so on.

Figure 10:
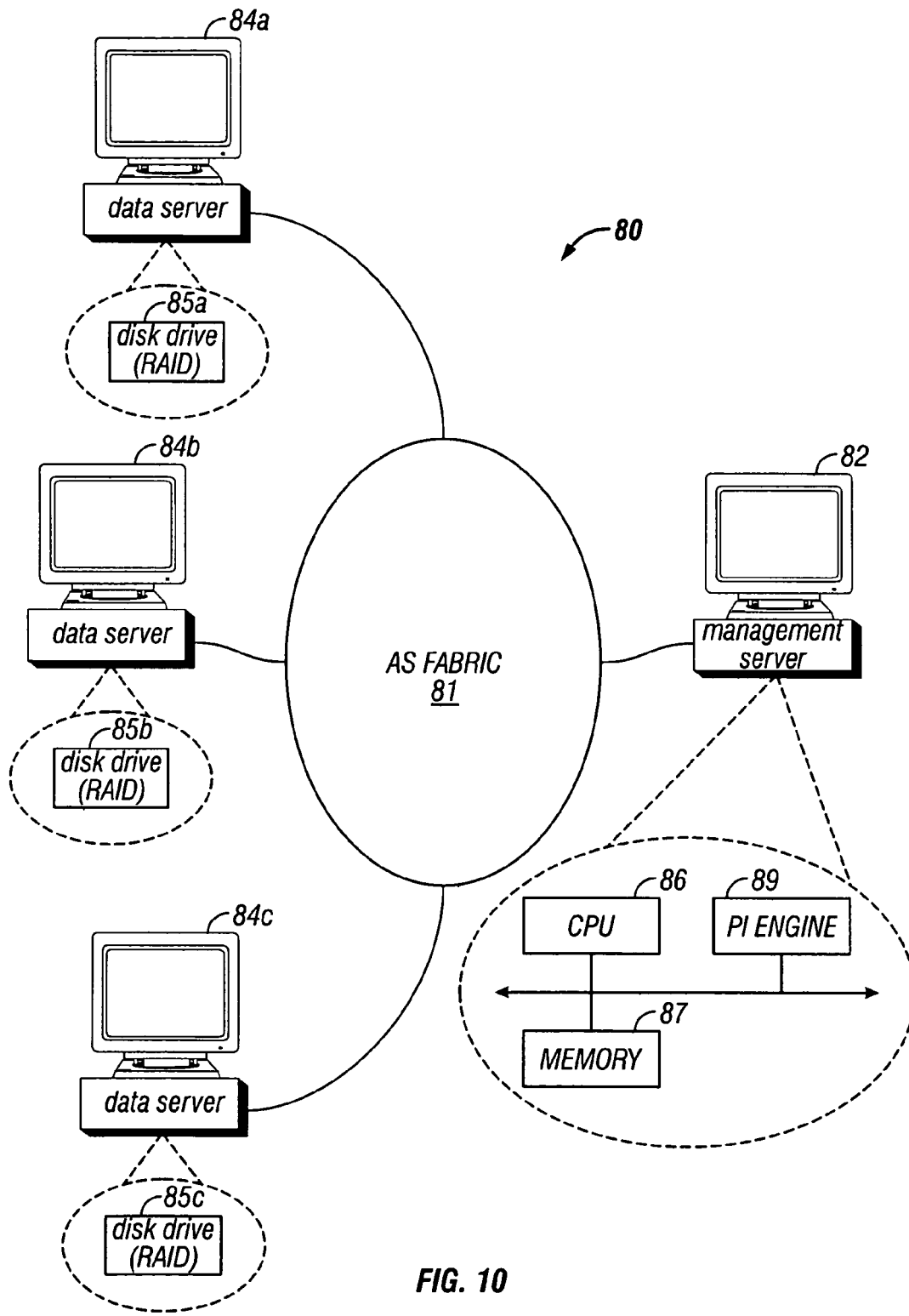
FIG. 10 is a block diagram of a data storage system that uses an AS fabric end node device and the process of FIG. 6.

The AS end node device described herein may be used in any context. For example, an AS end node device may be used in a storage system 80, as shown in FIG. 10, which passes data among various data servers across AS fabric 81. Storage system 80 includes a management server 82 that acts as a manager for storage system 80. Management server 82 controls storage and access of data to/from other data servers in the system. These other data servers 84a, 84b, 84c are each in communication with management server 82 via AS fabric 81. Data servers 84a, 84b, 84c may each contain one or more disk drives 85a, 85b, 85c (e.g., redundant array of inexpensive disks (RAID)) to store data received via AS fabric 81.

As shown in FIG. 10, management server 82 includes a CPU 86 that stores descriptors in a queue (e.g., ring buffers) in memory 87. As described above, the descriptors contain information used to packetize data for transmission across AS fabric 81. Management server 82 also contains a protocol interface (PI) engine 89 that retrieves descriptors from memory 87, and that uses the descriptors to generate data packets for transmission to one or more of the other data servers via AS fabric 81. PI engine 89 has substantially the same configuration and function as PI engine 29 of FIG. 5.

In one example, PI engine 89 retrieves a descriptor from a queue, and uses the descriptor to build a read request packet for transmission to data server 84a via AS fabric 81. PI engine 89 includes a transmit engine, as described above, that generates a read request packet from the descriptor. The read request packet is for accessing data stored on disk drive 85a of data server 84a. The transmit engine associates a first transaction identifier with the read request packet. A receive engine receives a reply packet from data server 84a in response to the read request packet. The reply packet contains a second transaction identifier. The receive engine compares the first transaction identifier to the second transaction identifier. If the first transaction identifier matches the second transaction identifier, the receive engine decides to store data from the reply packet at a local address of data server 84a that is associated with the first transaction identifier. This arrangement facilitates storage of data from the reply packet on data server 84a, as described above. As noted, storage may be via memory interfacing logic (not shown) in response to commands from the receive engine.

One or more of the other data serves 84a, 84b, 84c may act as a local management server for a sub-set of data servers (or other data servers). Each server in this sub-set may include RAID or other storage media, which the local management server can access without going through a local CPU. The architecture of such a data server 84a is substantially identical to that of management server 82.

Figure 11:
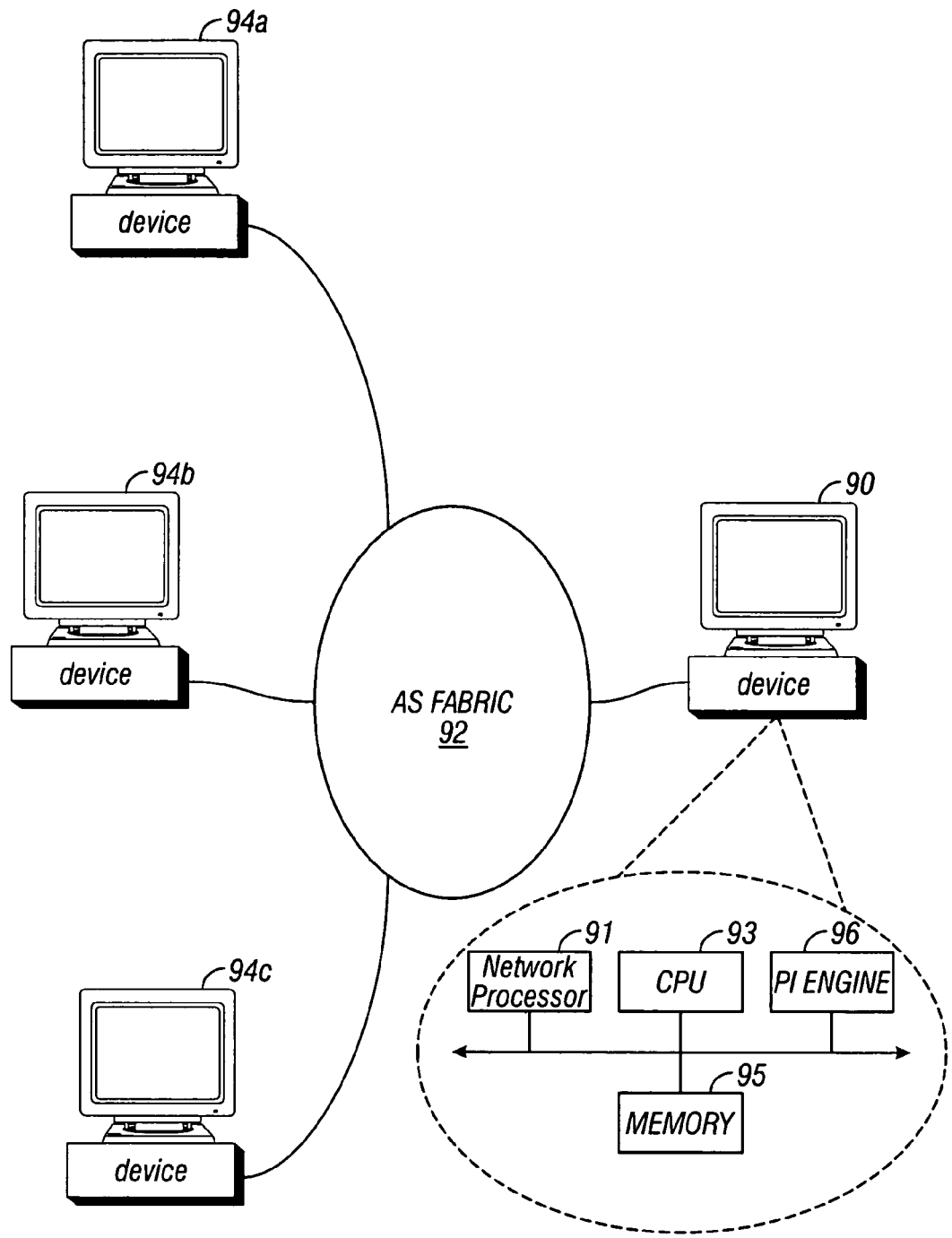
FIG. 11 is a block diagram of a network that uses an AS fabric end node device and the process of FIG. 6.

The AS end node device described herein may also be used in connection with a network processor. For example, as shown in FIG. 11, end node device 90 may contain a network processor 91 that identifies a condition, such as congestion, on a network containing AS fabric 92. End node device 90 contains a CPU 93 that receives an indication of the condition from network processor 91, and that generates descriptors, such as those described herein, in response to the condition. The descriptors contain information used to build data packets, e.g., to request that one or more of network devices 94a, 94b, 94c connected to AS fabric 92 halt or reduce operation in order to alleviate the congestion. As above, CPU 93 stores the descriptors in a memory 95. A PI engine 96 (having the same architecture as PI engine 29) retrieves the descriptors from memory, and uses the descriptors to generate request packets for transmission to one or more other network devices 94a, 94b, 94c via AS fabric 92.

The foregoing are only two examples of systems in which an AS end node device of FIGS. 5 and 13 may be implemented. The AS end node device may be employed in other systems not specifically described herein.

Furthermore, the processes described herein are not limited to use with the hardware and software described herein; it may find applicability in any computing or processing environment The processes can be implemented in digital electronic circuitry, or in computer hardware, firmware, software, or in combinations of them. The processes can be implemented as a computer program product or other article of manufacture, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The processes can be performed by one or more programmable processors executing a computer program to perform functions. The processes can also be performed by, and corresponding apparatuses can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

Information carriers suitable for embodying computer program instructions and data include all forms of nonvolatile memory, including by way of example semiconductor memory devices, e.g., EPROM (electrically programmable read-only memory), EEPROM (electrically erasable programmable read-only memory), and flash memory devices; magnetic disks, e.g., internal hard disks or removable disks; magneto-optical disks; and CD-ROM (compact disc read-only memory) and DVD-ROM (digital video disc read-only memory). The processor and the memory can be supplemented by, or incorporated in special purpose logic circuitry.

The processes described herein can be implemented in a computing system that includes a back-end component, e.g., as a data server, or that includes a middleware component, e.g., an application server, or that includes a front-end component, e.g., a client computer, or any combination of such back-end, middleware, or front-end components.

The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

Other embodiments not described herein are also within the scope of the following claims.

What is claimed is:

1. An apparatus that communicates with an advanced switching (AS) fabric, the apparatus comprising:
   a transmit engine to generate a request packet for transmission to the AS fabric, and to transmit the request packet to the AS fabric, the transmit engine being configured to associate a first transaction identifier with the request packet;
   wherein the transmit engine is configured to generate the request packet using a packet descriptor, the transmit engine being configured to retrieve the packet descriptor from one of plural registers that are assigned priority levels and that are accessible by the transmit engine based on the priority levels, at least one of the priority levels corresponding to a number of packet descriptors to retrieve; and
   a receive engine to receive a reply packet in response to the request packet transmitted to the AS fabric by the transmit engine, the reply packet containing a second transaction identifier, the receive engine being configured to compare the first transaction identifier to the second transaction identifier, wherein, if the first transaction identifier matches the second transaction identifier, the receive engine is configured to store data associated with the reply packet at an address associated with the first transaction identifier, the data being stored in association with the transaction identifier.

2. The apparatus of claim 1, further comprising:
   memory to store the first transaction identifier;
   wherein the receive engine is configured to retrieve the first transaction identifier from the memory for comparison to the second transaction identifier.

3. The apparatus of claim 1, wherein the address comprises an address in a local memory of a device associated with the apparatus.

4. The apparatus of claim 1, wherein the receive engine is configured to store an indication that the data has been stored at the address, the indication being stored in a local memory of a device associated with the apparatus.

5. The apparatus of claim 1, wherein the reply packet is part is of a series of plural reply packets that are in response to the request packet, the receive engine being configured to keep track of a sequence identifier associated with the plural reply packets, the sequence identifier for ordering the plural reply packets, the receive engine being configured to provide an indication that data from the plural reply packets has been stored, the receive engine being configured to provide the indication after a last one of the plural reply packets has been received.

6. A method of communicating with an advanced switching (AS) fabric, the method comprising:
   generating a request packet for transmission to the AS fabric, the request packet having a first transaction identifier associated therewith, wherein the request packet is generated using a packet descriptor, the packet descriptor being retrieved from one of plural registers that are assigned priority levels and that are accessible based on the priority levels, at least one of the priority levels corresponding to a number of packet descriptors to retrieve;
   receiving a reply packet from the AS fabric in response to the request packet, the reply packet having a second transaction identifier associated therewith; and
   comparing the first transaction identifier to the second transaction identifier;
   wherein, if the first transaction identifier matches the second transaction identifier, the method further comprises storing data associated with the reply packet at an address associated with the first transaction identifier, the data being stored in association with the first transaction identifier.

7. The method of claim 6, wherein the address comprises an address in a local memory of a device that communicates with the AS fabric.

8. The method of claim 6, further comprising:
   storing an indication that the data has been stored at the address, the indication being stored in a local memory of a device that communicates with the AS fabric.

9. The method of claim 6, wherein the reply packet of a series of plural reply packets that are in response to the request packet, and the method further comprises:
   keeping track of sequence identifier associated with the plural reply packets, the sequence identifier for ordering the plural reply packets; and
   providing an indication that data from the plural reply packets has been stored, the indication being provided after a last one of the plural reply packets has been received.

10. An article comprising a machine-readable medium that stores instructions for use in communicating with an advanced switching (AS) fabric, the instructions for causing a machine to:

generate a request for transmission to the AS fabric, the request packet having a first transaction identifier associated therewith, wherein the request packet is generated using a packet descriptor, the packet descriptor being retrieved from one of plural registers that are assigned priority levels and that are accessible based on the priority levels, at least one of the priority levels corresponding to a number of packet descriptors to retrieve;

receive a reply packet from the AS fabric in response to the request packet, the reply packet having a second transaction identifier associated therewith; and compare the first transaction identifier to the second transaction identifier;

wherein, if the first transaction identifier matches the second transaction identifier, the instructions cause the machine to store data associated with the reply packet at an address associated with the first transaction identifier, the data being stored in association with the first transaction identifier.

11. The article of claim 10, wherein the address comprises an address in a local memory of a device that communicates with the AS fabric.

12. The article of claim 10, further comprising instructions that cause the machine to:

store an indication that the data has been stored, the indication being stored in a local memory of a device that communicates with the AS fabric.

13. The article of claim 10, wherein the reply packet is part of a series of plural reply packets that are in response to the request packet, and the article further comprises instructions that cause the machine to:

keep track of a sequence identifier associated with the plural reply packets, the sequence identifier for ordering the plural reply packets; and provide an indication that data from the plural reply packets has been stored at the address, the indication being provided after a last one of the plural reply packets has been received.

14. A storage system that passes data across an advanced switching (AS) fabric, the storage system comprising:

a first server to manage the storage system; and plural data servers, each of the plural data servers being in communication with the first server via the AS fabric, the plural data servers each containing one or more disk drives to store data accessible via the AS fabric;

wherein the first server comprises:

a transmit engine to generate a read request packet for transmission to a target data server on the AS fabric, and to transmit the read request packet to the AS fabric, the read request packet for accessing data stored on a disk drive of the target data server, the transmit engine being configured to associate a first transaction identifier with the read request packet;

wherein the transmit engine is configured to generate the request packet using a packet descriptor, the transmit engine being configured to retrieve the packet descriptor from one of plural registers that are assigned priority levels and that are accessible by the transmit engine based on the priority levels, at least one of the priority levels corresponding to a number of packet descriptors to retrieve; and a receive engine to receive a reply packet in response to the read request packet transmitted to the AS fabric by the transmit engine, the reply packet containing a second transaction identifier, the receive engine being configured to compare the first transaction identifier to the second transaction identifier, wherein, if the first transaction identifier matches the second transaction identifier, the receive engine is configured to store data associated with the reply packet at an address associated with the first transaction identifier, the data being stored in association with the first transaction identifier.

15. The storage system of claim 14, wherein the reply packet is part of a series of plural reply packets that are in response to the read request packet, the receive engine being configured to keep track of a sequence identifier associated with the plural reply packets, the sequence identifier for ordering the plural reply packets, the receive engine being configured to provide an indication that data from the plural reply packets has been stored at the address, the receive engine being configured to provide the indication after a last one of the plural reply packets has been received.

* * * * *